(12) United States Patent
Egbert et al.

(10) Patent No.: US 8,411,362 B2
(45) Date of Patent: Apr. 2, 2013

(54) OPTICAL ELEMENT RETAINING SYSTEM FOR SENSOR SYSTEMS

(75) Inventors: Ryan A. Egbert, Tucson, AZ (US); Christopher L. Hernandez, Corona De Tucson, AZ (US)

(73) Assignee: Raytheon Company, Waltham, MA (US)

(*) Notice: Subject to any disclaimer, the term of this patent is extended or adjusted under 35 U.S.C. 154(b) by 134 days.

(21) Appl. No.: 13/035,613

(22) Filed: Feb. 25, 2011

(65) Prior Publication Data

US 2012/0218628 A1   Aug. 30, 2012

(51) Int. Cl.
*G02B 27/10* (2006.01)
(52) U.S. Cl. .......................................... 359/618; 359/819
(58) Field of Classification Search .................. 359/618, 359/819
See application file for complete search history.

(56) References Cited

U.S. PATENT DOCUMENTS

| 4,234,145 | A | 11/1980 | Leiboff |
| 7,213,321 | B2 | 5/2007 | Franco et al. |
| 2004/0114919 | A1 | 6/2004 | Rife |
| 2011/0051448 | A1* | 3/2011 | Owada .......................... 362/520 |

FOREIGN PATENT DOCUMENTS

JP   2003198921 A   7/2003

OTHER PUBLICATIONS

International Search Report and Written Opinion from corresponding International Application No. PCT/US12/20452.

* cited by examiner

*Primary Examiner* — James Jones
(74) *Attorney, Agent, or Firm* — Renner, Otto, Boisselle & Sklar, LLP

(57) ABSTRACT

A system for retaining an optical element with a card assembly and heat sink is provided. The retaining system includes an optical element fastener and a retainer member. The optical element fastener is configured to hold the optical element to the heat sink. The retaining member is configured to hold the card assembly to the heat sink, and also serves to make the optical element fastener captive. In one embodiment, the retaining member includes a ridge for holding the card assembly to the heat sink. The top end of the retainer member may also include one or more recessed slots for tool engagement to facilitate fastening of the retainer member. In one embodiment, the retaining member is threaded at the bottom end to fasten the retaining member to the heat sink. Also, in one embodiment the retaining member includes an axial opening used to access the optical element fastener.

20 Claims, 4 Drawing Sheets

OPTICAL ELEMENT RETAINING SYSTEM FOR SENSOR SYSTEMS

TECHNICAL FIELD

The present invention relates to optical systems, including optical guidance systems.

BACKGROUND

A variety of guidance systems are used in military applications. As one example, some guidance systems use sensor systems such as an infrared (IR) camera. The IR camera is an imaging sensor that provides an infrared image of the target that is used by the operator and/or guidance system to guide a missile or other weapon to a target. As another example, some guidance systems use radio frequency sensors, such as millimeter wave (MMW) sensors. Systems that use RF sensors typically include a transmitter to transmit RF energy to the target and a receiver to receive RF energy reflected from the target area. As a third example, semi-active laser (SAL) designation is used in some military systems to designate targets. In a typical SAL system, the operator of a SAL designator fires a narrow pulsed laser beam at a target. The laser beam fired by the SAL designator reflects off the target to provide a reflected spot that may be detected by a SAL sensing system. The SAL sensing system includes processing equipment for generating guidance commands from the pulse-stream to guide the weapon to impact.

The IR, RF and SAL sensor systems are just some examples of the type of sensor systems that use optical elements in the weapon guidance systems.

One issue in sensing systems is the continuing need to reduce the cost of the sensing system. Another issue is the continuing need to reduce the size of the sensing system. This is of particular importance in the new generations of weapon systems that are being designed to provide active guidance for smaller ordinance.

Thus, there remains a continuing need for sensing systems in general, and sensing systems in weapons guidance systems in particular, that may be provided with reduced cost and smaller size. Other desirable features and characteristics of the present invention will become apparent from the subsequent Detailed Description and the appended Claims, taken in conjunction with the accompanying Drawings and this Background.

BRIEF SUMMARY

A system for retaining an optical element with a card assembly and heat sink is provided. The retaining system includes an optical element fastener and a retainer member. The optical element fastener is configured to hold the optical element to the heat sink. The retaining member is configured to hold the card assembly to the heat sink, and also serves to make the optical element fastener captive.

In one embodiment, the retaining member includes a ridge for holding the card assembly to the heat sink. In one embodiment, the ridge extends circumferentially around the top end of the retainer member. The top end of the retainer member may also include one or more recessed slots for tool engagement to facilitate fastening of the retainer member. In one embodiment, the retaining member is threaded at the bottom end to fasten the retaining member to the heat sink. Also, in one embodiment the retaining member includes an axial opening used to access the optical element fastener.

The retaining system may facilitate reduced size in sensors used in guidance systems. Specifically, the retaining system may provide for the retaining of the optical element, card assembly and heat sink in one location together. Thus, the retaining system may be used to conserve space on the card assembly, heat sink, and/or optical element.

BRIEF DESCRIPTION OF THE DRAWINGS

At least one example of the present invention will hereinafter be described in conjunction with the following figures, wherein like numerals denote like elements, and.

DETAILED DESCRIPTION

A retaining system for use in a sensing system is provided. The retaining system includes an optical element fastener and a retainer member. The optical element fastener is configured to hold the optical element to the heat sink. The retaining member is configured to hold the card assembly to the heat sink, and also serves to make the optical element fastener captive. In one embodiment, the retaining member includes a ridge for holding the card assembly to the heat sink. The top end of the retainer member may also include one or more recessed slots for tool engagement to facilitate fastening. Also, in one embodiment the retaining member includes an axial opening used to access the optical element fastener.

The retaining system may facilitate reduced size in sensors used in guidance systems. Specifically, the retaining system may provide for the retaining of the optical element, card assembly and heat sink in one location together. Thus, the retaining system may be used to conserve space on the card assembly, heat sink, and/or optical element.

Guidance systems are used in a wide variety of weapons systems. In general, guidance systems provide active control of the weapon to increase accuracy and the likelihood of striking the target. An integral part of most guidance systems are the one or more sensor systems configured to receive signals provide the guidance system with information regarding the signals.

A variety of guidance systems are used in military applications. As one example, some guidance systems use sensor systems such as an infrared (IR) camera. The IR camera provides an image of the target that is used by the guidance system to guide a missile or other weapon to a target. As another example, some guidance systems use radio frequency (RF) sensors, such as millimeter wave (MMW) sensor. As a third example, semi-active laser (SAL) designation is used in some military systems to designate targets.

Figure 1:
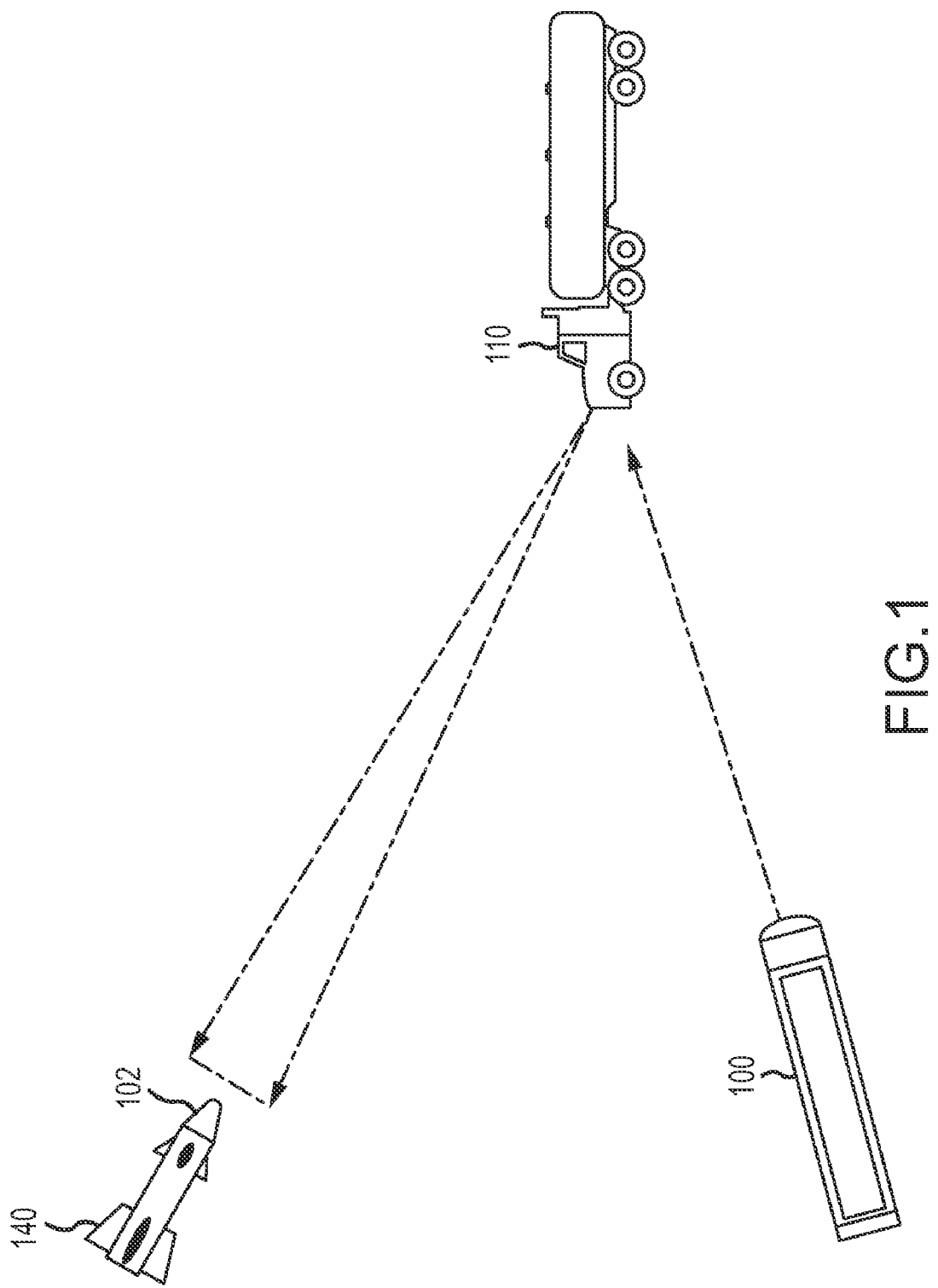
FIG. 1 is a view of a exemplary guided weapons system.

Turning now to FIG. 1, an exemplary weapon sensing system 102 on a missile 140 tracks a target 110. In one embodiment, the sensing system 102 includes an IR sensor that provides an infrared image of the target 110, which is used by the guidance system to guide the missile 140 to the target 110. In another embodiment, the sensing system includes an RF sensor for tracking reflected RF energy from the target area. In another embodiment, the sensing system includes a sensor for detecting laser light directed at the target 110 by laser designator 100. In some embodiments, the sensing system may include multiple such sensors of different types to provide system flexibility. Such systems are generally referred to as multi-mode guidance systems and are increasingly used to make more flexible and effective weapon systems.

In all such systems the guidance system processes signals from the sensing system 102, and will typically include processing for initiating the generation of guidance commands from the reflected returns to guide the weapon to impact.

Figure 2:
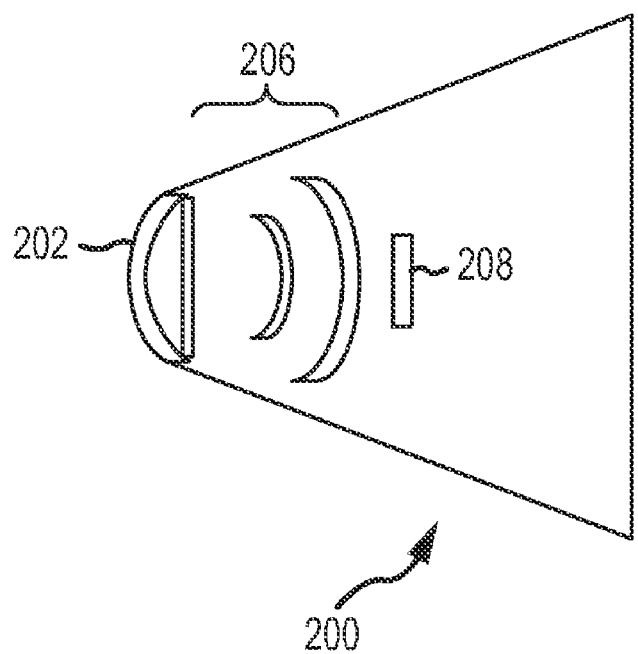
FIG. 2 is a side view of a sensing system in accordance with an embodiment of the invention.

Turning now to FIG. 2, an exemplary sensing system 200 in accordance with an embodiment of the invention is illustrated schematically. The sensing system 200 includes an aperture lens 202, one or more optical elements 206, and a detector 208. The aperture lens 202 is configured to receive reflected electromagnetic radiation from the target, and pass the received radiation to the optical elements 206, which focuses the received radiation to the detector 208. As such, the optical elements may include any suitable combination of elements, such as lenses, diffusers, filters, mirrors, etc.

In general, the detector 208 detects the presence of the electromagnetic radiation which has passed through the optical elements 206, and generates a signal which is communicated to a guidance system (not shown in FIG). In typical operation the guidance system receives the signal communicated from the detector 208 and provides signals to the flight control system to control the path of the projectile. As such, the guidance system may include moving components, such as a gimbaled seeker, or may be fixed-post. The guidance system may further comprise any additional elements or components to facilitate implementation, such as a housing, connectors, retaining rings, alignment rings, barrels, pins, adhesives, gaskets, compliant material, spacers, and/or the like.

The detector 208 may be configured in any appropriate manner to detect the relevant energy and generate corresponding signals. For example, the detector 208 may comprise an IR detector configured to detect infrared radiation. As another example, the detector 208 may be configured to detect reflected RF signals. The output signal may vary depending on the position of the incident radiation on the detector 208, and may vary in response to a change in the properties of incident radiation, such as frequency, energy density, wavelength, and total energy.

Again, the sensing system 200 is meant to be exemplary of any type of sensing system, including the IR, RF, SAL and multi-mode systems discussed above. It should be noted that such systems could typically include many different combinations of elements, and that the example of FIG. 2 is merely intended to be exemplary of the wide variety of such systems.

In many such sensing systems there is a need to mount various elements together. For example, one or more optical elements may need to be mounted to elements such as circuit card assemblies (CCA). In general CCA's are used to mechanically support and electrically connect electronic components. A typical CCA will include a substrate with conductive pathways, referred to as tracks or traces that are typically patterned onto the substrate. Additionally, a typical CCA will include one or more electronic components, such as integrated circuits, passive and active components, terminals and connectors. In a sensing system implementation, these electronic components will typically include the electronic devices used to facilitate sensing, and thus may include a variety of different types of processing devices, including both analog and digital devices. Additionally, these electronic components may include one or more detectors, such as detector 208 illustrated in FIG. 2.

Also, in many such systems it may be desirable for the optical element and/or CCA assembly to mount to heat dissipation devices generally known as heat sinks. In general, heat sinks are components or assemblies that are configured to transfer heat. For example, to transfer heat generated by the electronic components to a fluid medium, such as air or a liquid. Some heat sinks use extended surfaces to increase the surface area in contact with the fluid medium. A typical heat sink is made from materials having good thermal conductive properties, such as aluminum or copper. Some heat sinks use active devices such as fans to increase thermal transfer, but this is not true for all applications.

The various embodiments disclosed herein provide a retaining system for use in a sensing system. The retaining system includes an optical element fastener and a retainer member. The optical element fastener is configured to hold the optical element to the heat sink. The retaining member is configured to hold the card assembly to the heat sink, and also serves to make the optical element fastener captive. The retaining system may facilitate reduced size in sensors used in guidance systems. Specifically, the retaining system may provide for the retaining of the optical element, card assembly and heat sink in one location together. Thus, the retaining system may be used to conserve space on the card assembly, heat sink, and/or optical element.

Figure 4:
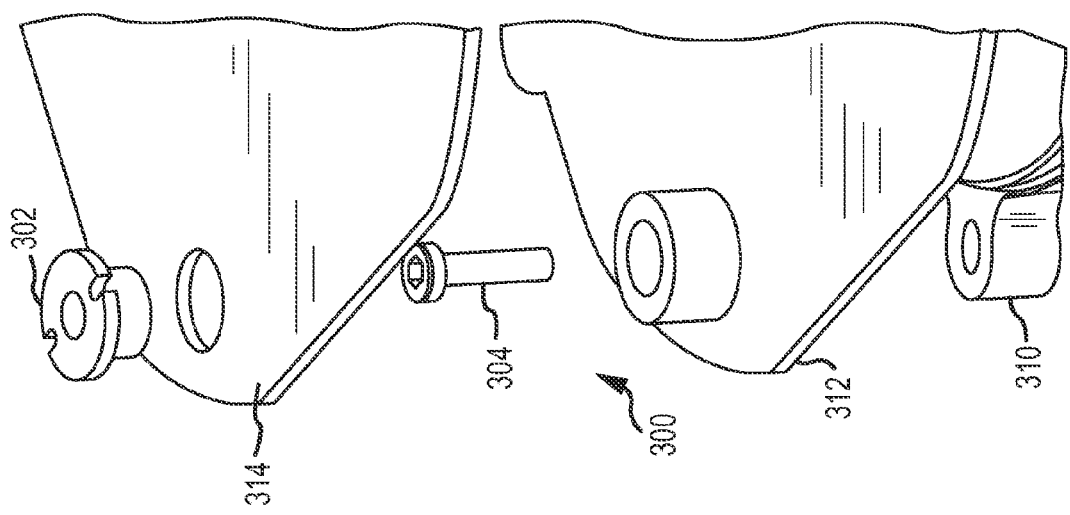
FIG. 4 is a exploded perspective view of a retaining system and a portion of a sensing system in accordance with an embodiment of the invention.
Figure 3:
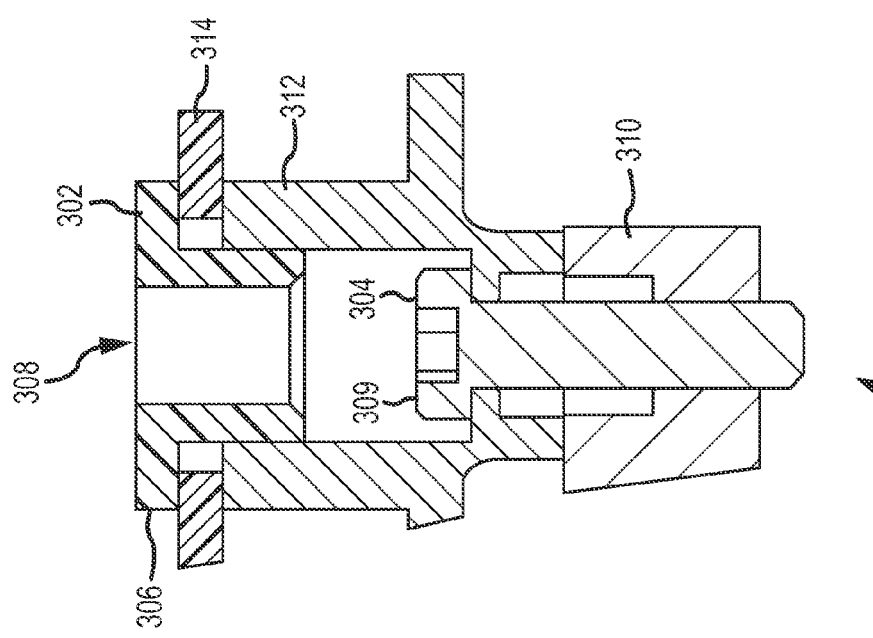
FIG. 3 is a cross-sectional side view of a retaining system in accordance with an embodiment of the invention.

Turning now to FIGS. 3 and 4, a cross-sectional side view and an exploded view of retaining system 300 is illustrated. The retaining system 300 is illustrated with an optical element 310, a heat sink 312 and a circuit card assembly 314. The retaining system 300 is provided to retain the optical element 310 with the heat sink 312 and the card assembly 314. The retaining system 300 includes a retaining member 302 and an optical element fastener 304. The optical element fastener 304 is configured to hold the optical element 310 to the heat sink 312. The retaining member 302 is configured to hold the card assembly 314 to the heat sink 312, and also serves to make the optical element fastener 304 captive.

In the illustrated embodiment, the retaining member 302 includes a ridge 306 for holding the card assembly 314 to the heat sink 312. In this illustrated embodiment, the ridge 306 extends circumferentially around the top end of the retainer member 302. Also in this embodiment the retaining member 302 is threaded at the bottom end, and the heat sink 312 includes receiving threads that the retaining member 302 is threaded into. This serves to couple the retaining member 302 to the heat sink 312, with the ridge 306 holding the card assembly 314. It should also be noted that structures other than threads may be used for fastening the retaining member 302 to the heat sink 312. Also, in the illustrated embodiment the retaining member 302 includes an axial opening 308 used to access the optical element fastener 304.

The optical element fastener 304 retains the optical element 310 to the heat sink 312. In the illustrated embodiment, the optical element fastener 304 includes a head 309 and a threaded body, with the optical element 310 including receiving threads that the fastener 304 is threaded into. This serves to fasten the optical element 310 to the heat sink 312. The head 309 of the optical element fastener 304 is configured to receive a tool. For example, the head 309 may be configured to receive a screwdriver, Allen wrench, Torx®, or any other suitable tool. It should also be noted that structures other than threads may be used for fastening the optical element fastener 304 to the optical element 310.

The axial opening 308 in the retaining member 302 allows the tool to engage the head 309 of the optical element fastener 304. This allows a tool to engage the optical element fastener 304 even when the retaining member 302 has been fastened into the heat sink 312. However, in some embodiments it is desirable that the axial opening 308 also be sized to prevent the optical element fastener 304 from passing through. Thus, when the retaining member 302 is fastened to the heat sink 312, the optical element fastener 304 may be accessed by the tool but is also made "captive", i.e., it cannot fall out.

The retaining member 302 may be made from a variety of materials. However, it is generally desirable to select a material that has coefficient of thermal expansion similar to that of the card assembly 314. This reduces the occurrences of thermally induced stresses on the card assembly 314 that would otherwise occur in environments with large temperature variations. As one example, the retaining member 302 is formed from a plastic material such as polyether ether ketone (commonly referred to as PEEK). Of course, other materials such as other polymers may be used.

Figure 5:
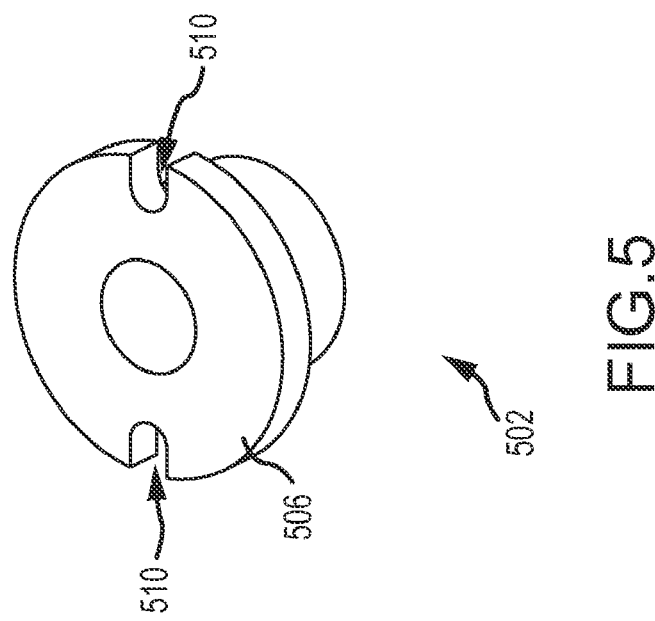
FIG. 5 is a perspective view of a retaining member in accordance with an embodiment of the invention.

In one embodiment, the top end of the retainer member may also include one or more recessed slots for tool engagement to facilitate fastening of the retainer member. Turning now to FIG. 5, a perspective view of an exemplary retaining member 502 is shown. The retaining member 502 again includes a ridge 506 for retaining the card assembly. In the illustrated embodiment, the ridge 506 includes two slots 510 configured to engage a tool for attaching the retaining member 502. These slots 510 may be used by a tool to screw in the retaining member 502 into the heat sink. Of course, other types of structures could also be used to facilitate this purpose.

Figure 6:
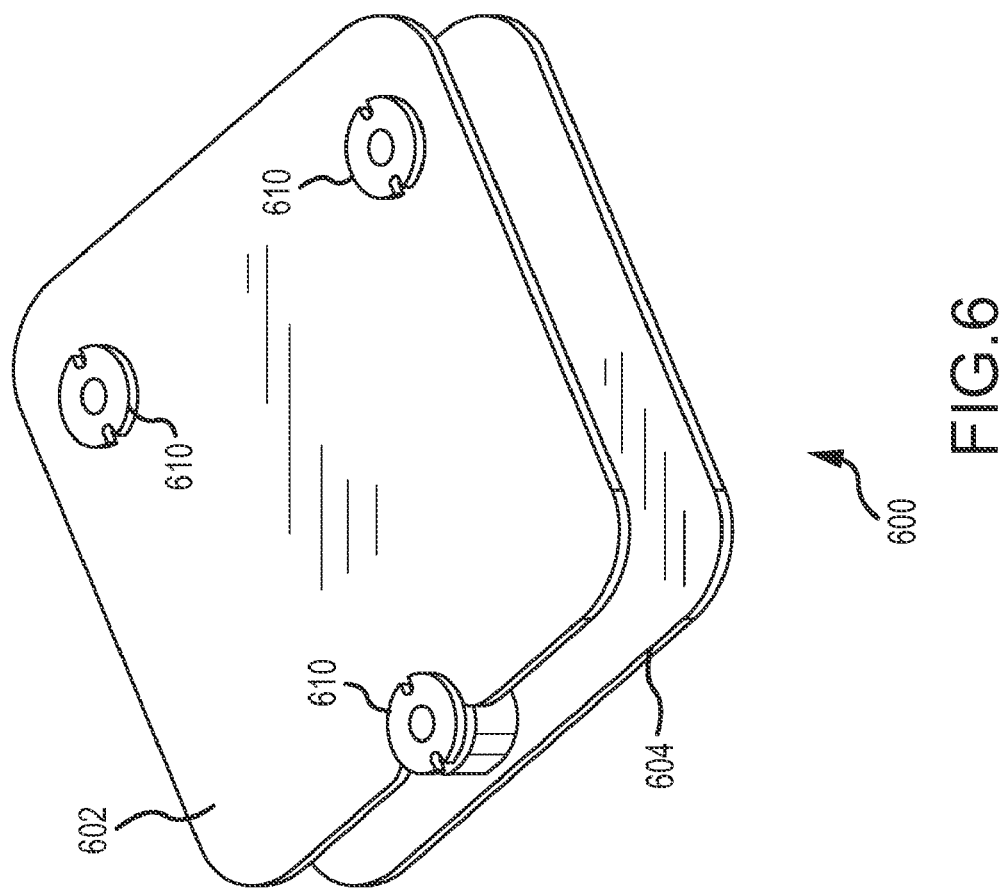
FIG. 6 is a perspective view of a retaining system and a portion of a sensing system in accordance with an embodiment of the invention.

The retaining system may facilitate reduced size in sensors used in guidance systems. Specifically, the retaining system may provide for the retaining of the optical element, card assembly and heat sink in one location together. Thus, the retaining system may be used to conserve space on the card assembly, heat sink, and/or optical element. Turning now to FIG. 6, a portion of a sensing system 600 is illustrated. The portion includes a card assembly 602 and a heat sink 604. An optical element is positioned below the heat sink 604 and is not shown.

In this illustrated embodiment, the retaining system includes three retaining members 610. As described above, these three retaining members 610 serve to hold the card assembly 602 to the heat sink 604. Furthermore, the serve to hold captive fasteners that are used to secure the heat sink 604 to the optical element (not shown in this FIG.).

It should be noted that in this arrangement the retaining members 610 are each co-located with a corresponding optical element fastener. This reduces the amount of area on the card assembly, heat sink, and/or optical element that is needed for fastening. For example, in the embodiment shown in FIG. 6, only three areas on the heat sink are needed to both fasten the card assembly to the heat sink, and to fasten the optical element to the heat sink. In contrast, prior approaches would have required separate areas on the heat sink for each of the different fasteners, and thus could have required several additional areas. Thus, the embodiments may save valuable area on the card assembly, heat sink and/or optical element. This reduction in space and the number of fasteners may also decrease the cost of the sensor components.

Thus, a system for retaining an optical element with a card assembly and heat sink has been provided. The retaining system includes an optical element fastener and a retainer member. The optical element fastener is configured to hold the optical element to the heat sink. The retaining member is configured to hold the card assembly to the heat sink, and also serves to make the optical element fastener captive.

The retaining system may facilitate reduced size in sensors used in guidance systems. Specifically, the retaining system may provide for the retaining of the optical element, card assembly and heat sink in one location together. Thus, the retaining system may be used to conserve space on the card assembly, heat sink, and/or optical element.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A retaining system for an optical element in a sensing system, the retaining system comprising:
   an optical element fastener that holds the optical element to a heat sink;
   a retaining member that holds a card assembly to the heat sink, the retaining member that makes captive the optical element fastener.

2. The retaining system of claim 1 wherein the retaining member includes a ridge for holding the card assembly to the heat sink.

3. The retaining system of claim 2 wherein the ridge extends circumferentially around a top end of the retaining member.

4. The retaining system of claim 1 wherein the retaining member includes an axial opening for accessing the optical element fastener.

5. The retaining system of claim 1 wherein the retaining member includes at least one slot for engaging a tool.

6. The retaining system of claim 1 wherein the retaining member includes a threaded portion that threads into the heat sink.

7. The retaining system of claim 1 wherein the optical element comprises a mirror in an infrared sensor.

8. A retaining system for retaining an optical element, a heat sink and card assembly in a sensing system, the retaining system comprising:
   an optical element fastener that holds the optical element to the heat sink;
   a retaining member, the retaining member including a threaded end that threads into the heat sink and a second end having a ridge that holds the card assembly to the heat sink, and wherein the retaining member includes an axial opening for providing access to the optical element fastener while the optical element fastener is made captive by the retaining member.

9. The retaining system of claim 8 wherein the optical element fastener comprises a screw that threads into the optical element to hold the optical element to the heat sink.

10. The retaining system of claim 8 wherein the retaining member includes at least two slots for engaging a tool.

11. The retaining system of claim 8 wherein the retaining member comprises polyether ether ketone.

12. The retaining system of claim 8 wherein the optical element comprises a lens in an infrared sensing system.

13. A retaining system for retaining an optical element, a heat sink and card assembly in a sensing system, the retaining system comprising:
- a set of at least three optical fasteners, each optical fastener in the set of optical fasteners that holds the optical element to the heat sink;
- a set of at least three retaining members, each retaining member in the set of the retaining members including a threaded end that threads into the heat sink and a ridge that holds the card assembly to the heat sink when the retaining member is threaded into the heat sink, and wherein each retaining member includes an axial opening sized to provide access for a first tool to engage a corresponding optical element fastener in the set of optical element fasteners while preventing the corresponding optical element fastener from passing through the axial opening such that the corresponding optical element fastener is both accessible and made captive by the retaining member.

14. The retaining system of claim 13 wherein each optical element fastener comprises a screw that threads into the optical element to hold the optical element to the heat sink.

15. The retaining system of claim 13 wherein each retaining member includes at least two slots for engaging a second tool.

16. The retaining system of claim 13 wherein the optical element comprises a lens in an infrared sensing system.

17. The retaining system of claim 13 wherein the optical element comprises an element in a radio frequency sensing system.

18. The retaining system of claim 13 wherein the optical element comprises an element in a laser sensing system.

19. The retaining system of claim 13 wherein the retaining member comprises polymer.

20. A retaining system for retaining an optical element, a heat sink and card assembly in a sensing system, the retaining system comprising:
- a set of at least three threaded screw fasteners, each threaded screw including a head, and each threaded screw fastener in the set of threaded screw fasteners that holds the optical element to the heat sink;
- a set of at least three retaining members, each retaining member in the set of the retaining members comprising polyether ether ketone material, each retaining member in the set of the retaining members including a threaded end that threads into the heat sink and a ridge that holds the card assembly to the heat sink when the retaining member is threaded into the heat sink, and wherein each retaining member includes an axial opening sized to provide access for a first tool to engage a head of a corresponding threaded screw fastener in the set of threaded screw fasteners while preventing the corresponding threaded screw fastener from passing through the axial opening such that the corresponding threaded screw fastener is both accessible and made captive by the retaining member.

* * * * *